(12) United States Patent
Jo et al.

(10) Patent No.: US 8,261,735 B2
(45) Date of Patent: Sep. 11, 2012

(54) FLAMELESS PORTABLE HEATING KIT

(76) Inventors: Byung Chul Jo, Seoul (KR); Byoung Kwon Cho, Seoul (KR); Byoung GU Cho, Seoul (KR)

(*) Notice: Subject to any disclaimer, the term of this patent is extended or adjusted under 35 U.S.C. 154(b) by 380 days.

(21) Appl. No.: 12/615,430

(22) Filed: Nov. 10, 2009

(65) Prior Publication Data

US 2011/0083662 A1 Apr. 14, 2011

(30) Foreign Application Priority Data

Oct. 14, 2009 (KR) .................. 10-2009-0097937

(51) Int. Cl.
*F24J 1/00* (2006.01)
(52) U.S. Cl. .................. 126/263.05; 126/263.01
(58) Field of Classification Search ............. 126/263.05, 126/263.01, 263.07; 426/113
See application file for complete search history.

(56) References Cited

U.S. PATENT DOCUMENTS

| | | | |
|---|---|---|---|
| 1,502,744 A * | 7/1924 | Perrault | .......................... 44/252 |
| 3,980,070 A | 9/1976 | Krupa | |
| 5,117,809 A | 6/1992 | Scaringe et al. | |
| 5,984,953 A | 11/1999 | Sabin et al. | |
| 6,286,754 B1 | 9/2001 | Stier et al. | |
| 6,289,889 B1 | 9/2001 | Bell et al. | |
| 7,971,585 B2 * | 7/2011 | Bommaraju | ............. 126/263.05 |
| 2005/0236468 A1 | 10/2005 | Sadlier | |

OTHER PUBLICATIONS

Non-final Office Action dated Feb. 3, 2011, for U.S. Appl. No. 12/750,816, filed Mar. 31, 2010.

* cited by examiner

*Primary Examiner* — Alfred Basichas
(74) *Attorney, Agent, or Firm* — Ronald A. D'Alessandro; Keohane & D'Alessandro PLLC

(57) ABSTRACT

As indicated above, the present invention provides a flameless, portable heating kit. In a typical embodiment, the heat pack contains a liquid activated heating material (e.g., in pack form) and utilizes a recycled heat design. This design includes an opening between a heat chamber and a content chamber where the contents (materials to be heated such as food, or a packet containing food such as a Meal Ready to Eat (MRE)) are placed. The heat materials such as steam, air or liquid are transported through a controlled opening that transfers heat to the heat chamber. The present invention also provides a heat control method that uses a filter or filters that filter by-product materials such as moisture and channels the by-products outside, while keeping the heating liquid material inside of the heat space chamber. Optimal control of the heating (chemical) materials' temperature offers a safe heating experience.

20 Claims, 11 Drawing Sheets

FLAMELESS PORTABLE HEATING KIT

PRIORITY CLAIM

This application claims priority under 35 U.S.C. 119 to Republic of Korea Application No. 10-2009-0097937, filed Oct. 14, 2009.

FIELD OF THE INVENTION

The present invention generally relates to flameless heating. Specifically, the present invention relates to a portable heating kit that requires neither flame nor any other heat source for activation.

BACKGROUND OF THE INVENTION

As outdoor activity continues to experience a growth in popularity, the need to keep items (e.g., food products) warm grows as well. Currently, many such meals come pre-packaged whereby food is contained within a foil packet or the like. Such meals are typically kept at room temperature. Accordingly, if the user wants to heat the meal, he/she must have access to a heat source such as a grill, fire, or the like. In many outdoor situations, grills and/or fires may not be either available or prudent. Existing approaches fail to provide an efficient design for a flameless portable heating kit as the generated heat dissipates rapidly.

SUMMARY OF THE INVENTION

As indicated above, the present invention provides a flameless, portable heating kit. In a typical embodiment, the heat pack contains a liquid activated heating material (e.g., in pack form) and utilizes a recycled heat design. This design includes an opening between a heat chamber and a content chamber where the contents (materials to be heated such as food, or a packet containing food such as a Meal Ready to Eat (MRE)) are placed. The heat materials such as steam, air or liquid are transported through a controlled opening that transfers heat to the heat chamber. The present invention also provides a heat control method that uses a filter or filters that filter by-product materials such as moisture and channels the by-products outside, while keeping the heating liquid material inside of the heat space chamber. Optimal control of the heating (chemical) materials' temperature offers a safe heating experience.

A first aspect of the present invention provides a portable heating kit, comprising: a first inner layer and a second inner layer; a filter coupling the first inner layer to the second inner layer; a first outer layer and a second outer layer surrounding the first inner layer, the second inner layer, and the filter; and a liquid activated heating material disposed between at least one of the following: the first inner layer and the first outer layer, or the second inner layer and the second outer layer.

A second aspect of the present invention provides a flameless, portable heating kit, comprising: a first inner layer and a second inner layer; a filter coupling the first inner layer to the second inner layer the filter directing a flow of a liquid around outer surfaces of the first inner layer and the second inner layer; a first outer layer and a second outer layer surrounding the first inner layer, the second inner layer, and the filter; a liquid activated heating material disposed between at least one of the following: the first inner layer and the first outer layer, or the second inner layer and the second outer layer; and wherein the first inner layer, the second inner layer, the first outer layer, the second outer layer each have a first end and a second end, and wherein the first end of the first outer layer and the first end of the second outer layer are configured to create a seal with one another.

A third aspect of the present invention provides a method for flameless heating, comprising: receiving a liquid into a flameless, portable heating kit; directing the liquid around a filter that connects a first inner layer and a second inner layer of the flameless, portable heating kit; and activating a liquid activated heating material with the liquid, the heating material being positioned between at least one of the following: the first inner layer and a first outer layer of the flameless, portable heating kit, or the second inner layer and a second outer layer of the flameless, portable heating kit.

BRIEF DESCRIPTION OF THE DRAWINGS

These and other features of this invention will be more readily understood from the following detailed description of the various aspects of the invention taken in conjunction with the accompanying drawings in which:

FIG. 4 shows a side cross-sectional view of the flameless, portable heating kit of claim of FIG. 1 as positioned within a container with content to be heated according to an aspect of the present invention.

Figure 1:
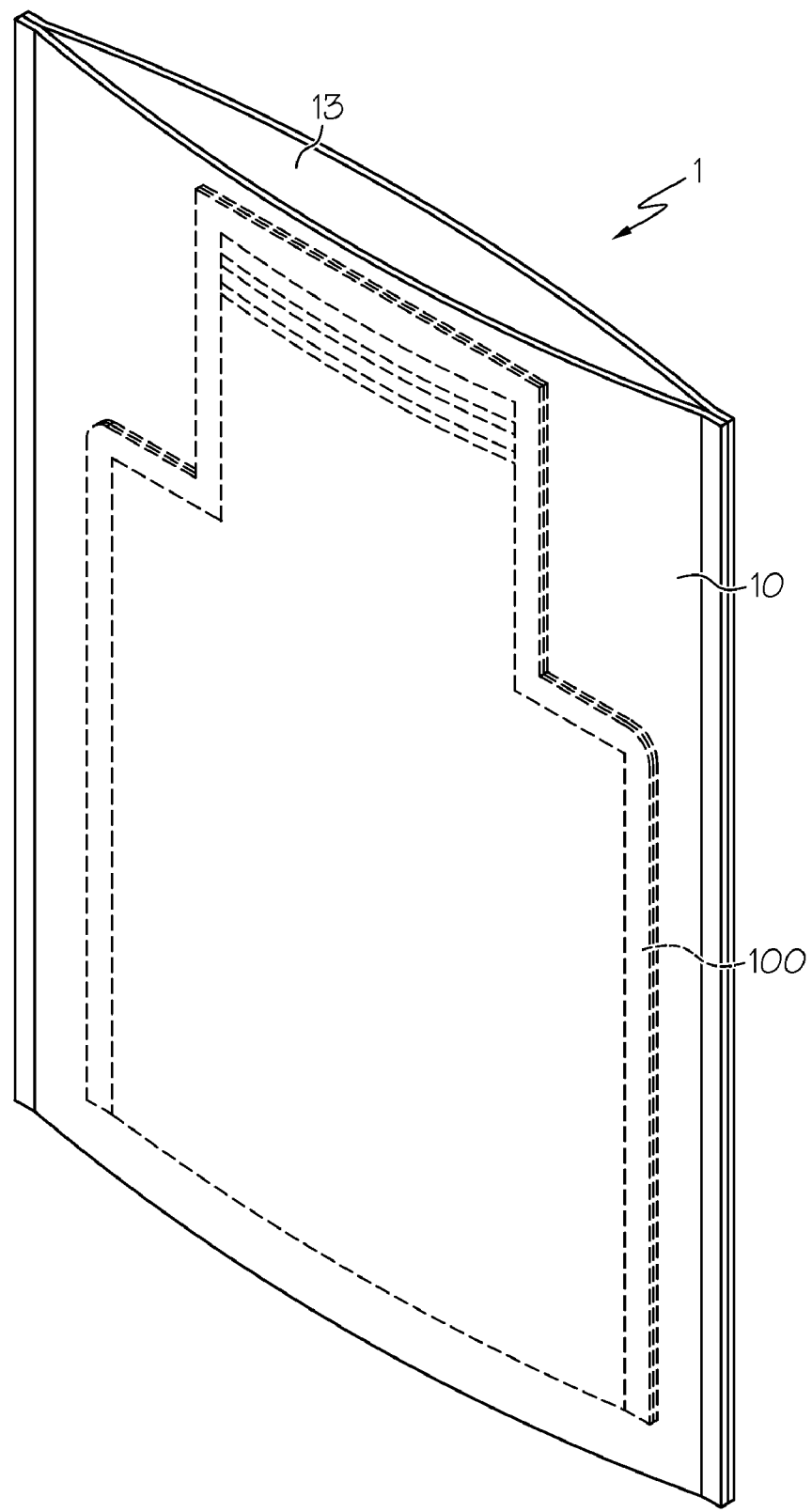
FIG. 1 shows a flameless, portable heating kit within a container according to an aspect of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a flameless, portable heating kit. In a typical embodiment, the heat pack contains a liquid activated heating material (e.g., in pack form) and utilizes a recycled heat design. This design includes an opening between a heat chamber and a content chamber where the contents (materials to be heated such as food, or a packet containing food such as a Meal Ready to Eat (MRE)) are placed.

The heat materials such as steam, air or liquid are transported through a controlled opening that transfers heat to the heat chamber. The present invention also provides a heat control method that uses a filter or filters that filter by-product materials such as moisture and channels the by-products outside, while keeping the heating liquid material inside of the heat space chamber. Optimal control of the heating (chemical) materials' temperature offers a safe heating experience.

Figure 2:
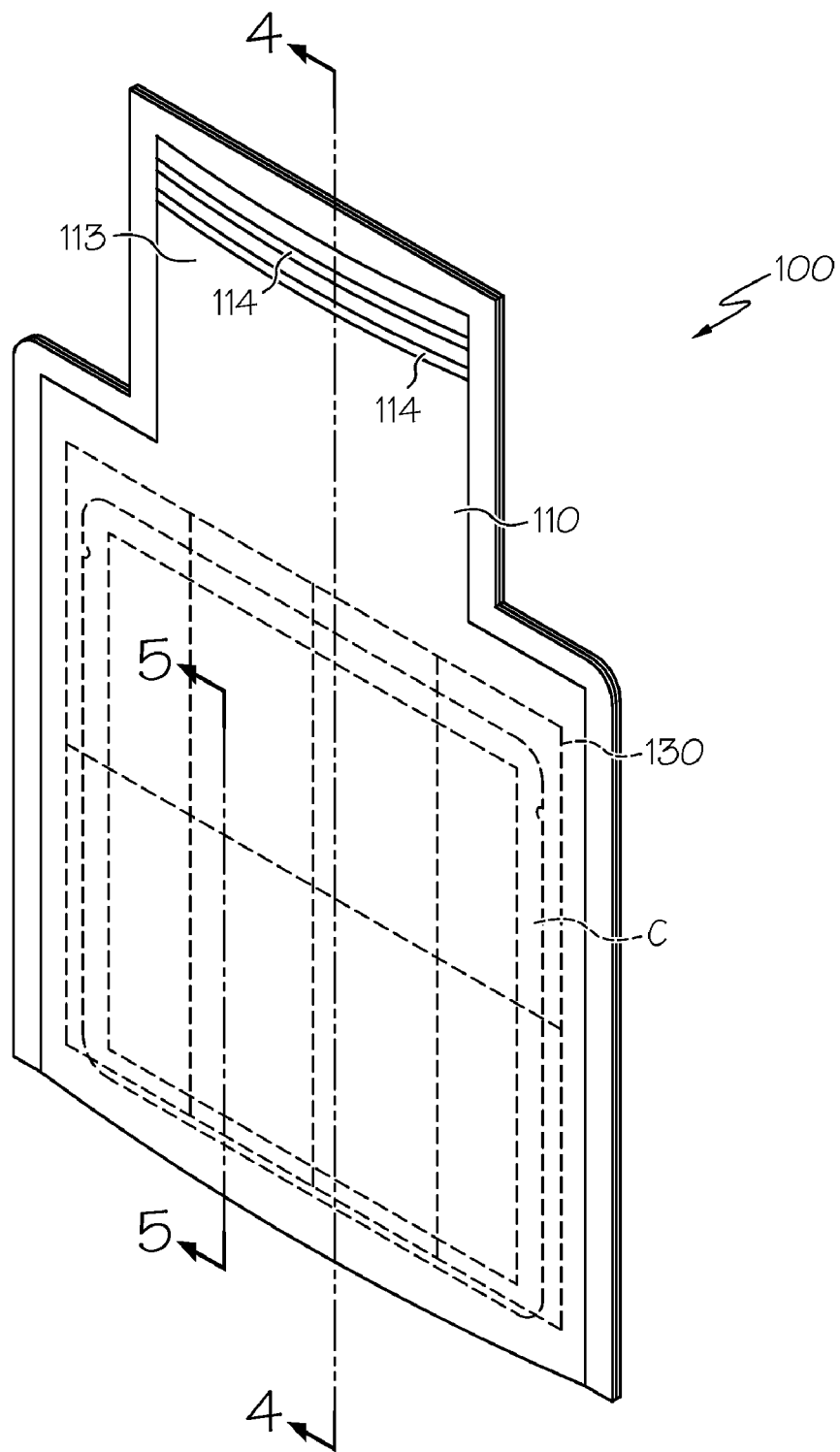
FIG. 2 shows the flameless, portable heating kit of claim of FIG. 1 according to an aspect of the present invention.

Referring now to FIGS. 1 and 2, a flameless, portable heating kit (hereinafter "kit 100") is shown. As depicted, kit 100 can be positioned within a container 10 (e.g., a thermoplastic pack) such as a thermoplastic pack or pouch via opening 13 to form a unit 1. In a typical embodiment kit 100 is comprised of a polymer such as polyethylene, polythene, etc. As will be further described below, kit 100 has a heating section 130 where content or material to be heated (hereinafter "content C"). In addition, kit 100 has an opening 113 that can be sealed along end 114.

Figure 3:
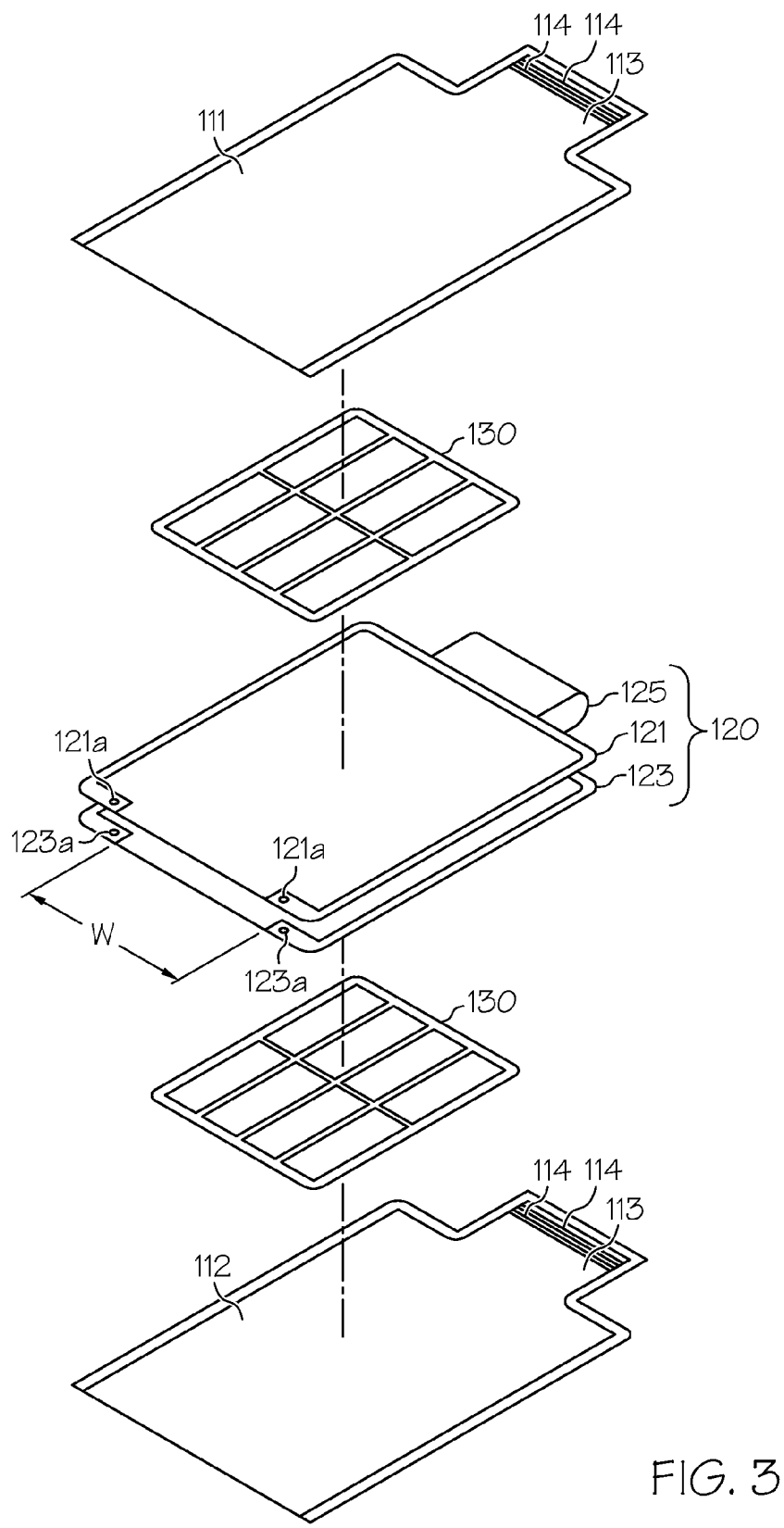
FIG. 3 shows an exploded view of the flameless, portable heating kit of claim of FIG. 1 according to an aspect of the present invention.

Referring now to FIG. 3 an exploded view of kit 100 is shown. As depicted, kit 100 includes first outer layer 111 and second outer layer 112, first inner layer 121 and second inner layer 123. Liquid activate heating material 130 is positioned between: (1) first outer layer 111 and first inner layer 121; and (2) second outer layer 112 and second inner layer 123. It should be understood that the placement of liquid activate heating material 130 as shown in FIG. 3 is intended only as one example of carrying out the present invention. Along these lines, many alternatives are possible.

Regardless, as further depicted, a first end 114 of first outer layer 111 and second outer layer 112 is configured so that a seal between the two ends can be created (thus closing off opening 113). In one embodiment, the seal is a Ziploc® type seal whereby the ends 114 of outer layers 111 and 112 are configured in a complementary tongue and groove fashion (Ziploc® is a trademark of the Dow Chemical Corporation in the United States and/or other countries). As will be further shown below, this seal will allow a liquid to be contained within kit 10 for activation of liquid activated heating material 130.

As further shown, a control filter device (hereinafter "filter 125") couples first inner layer 121 to second inner layer 123 at one end. As will be further described below this, among other things, allows a flow of a liquid around inner layers 121 and 123 and provides recycling of heat within kit 100. As will be further shown below end 121a of first inner layer 121 is coupled to an end of first outer layer 111, while end 123a of second inner layer 123.

Figure 4:
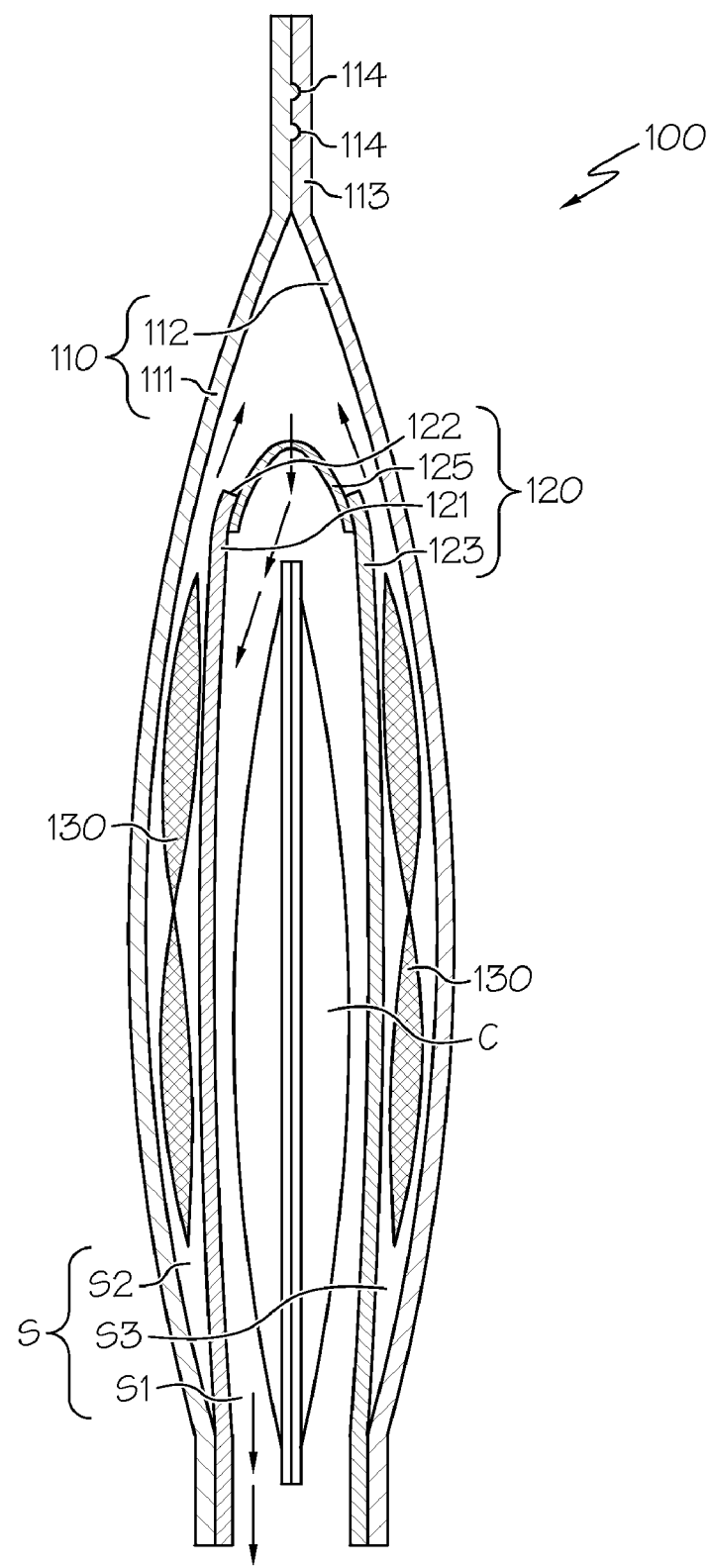
FIG. 4 shows a side cross-sectional view of the flameless, portable heating kit of claim of FIG. 1 according to an aspect of the present invention.

Referring now to FIG. 4, a side cross-sectional view of kit 100 is shown. As depicted, sides 113 and 114 of outer layers 111 and 112 are sealed to one another. A filter 125 (e.g., High-Efficiency Pleated Polypropylene (PP)) couples a first end of inner layers 121 and 123 to one another. Conversely, the second end of first inner layer 121 is coupled to the second end of first outer layer 111, while the second end of second inner layer 123 is coupled to the second end of second outer layer 112. This configuration provides a content chamber 115 where materials to be heated and/or kept heated (e.g., food products, a user's hand, etc.). Specifically, filter 125 is designed to allow steam or gas to permeate therethrough, while preventing liquid such as water from permeating.

Also shown in FIG. 4 is liquid activated heating material 130 positioned in heating spaces S2 and S3. Specifically, as described above, liquid activated heating material 130 is positioned between: (1) first outer layer 111 and first inner layer 121; and (2) second outer layer 112 and second inner layer 123. It should be understood that this need not be the case. For example, liquid activated heating material 130 should be placed in only one heating space (e.g., S2 or S3). Also, liquid activated heating material 130 could be segmented into a great quantity of units rather than the two units shown in FIG. 4.

In any event, when content C is desired to be heated, ends 114 are unsealed and liquid is poured into opening 113. Filter 125 will direct the flow of the liquid around outer surfaces of inner layers 121 and 123 and into heating spaces S2 and S3 where the liquid will contact liquid activated heating material 130. Upon contact, liquid activated heating material 130 will be activated and begin to generate heat. This heat will be cycled and recycled (as shown by the arrows of FIG. 4) via filter 125 and inner layers 121 and 123 within kit 100, thus providing heat to heating spaces S1, S2, and S3. Such heat circulation will heat contents C that are/were placed in content chamber 115. As mentioned above, content chamber 115 was created by the coupling of first inner layer 121 to first outer layer 111, and the coupling of second inner layer 123 to second outer layer 112 along the bottom ends thereof.

Figure 5:
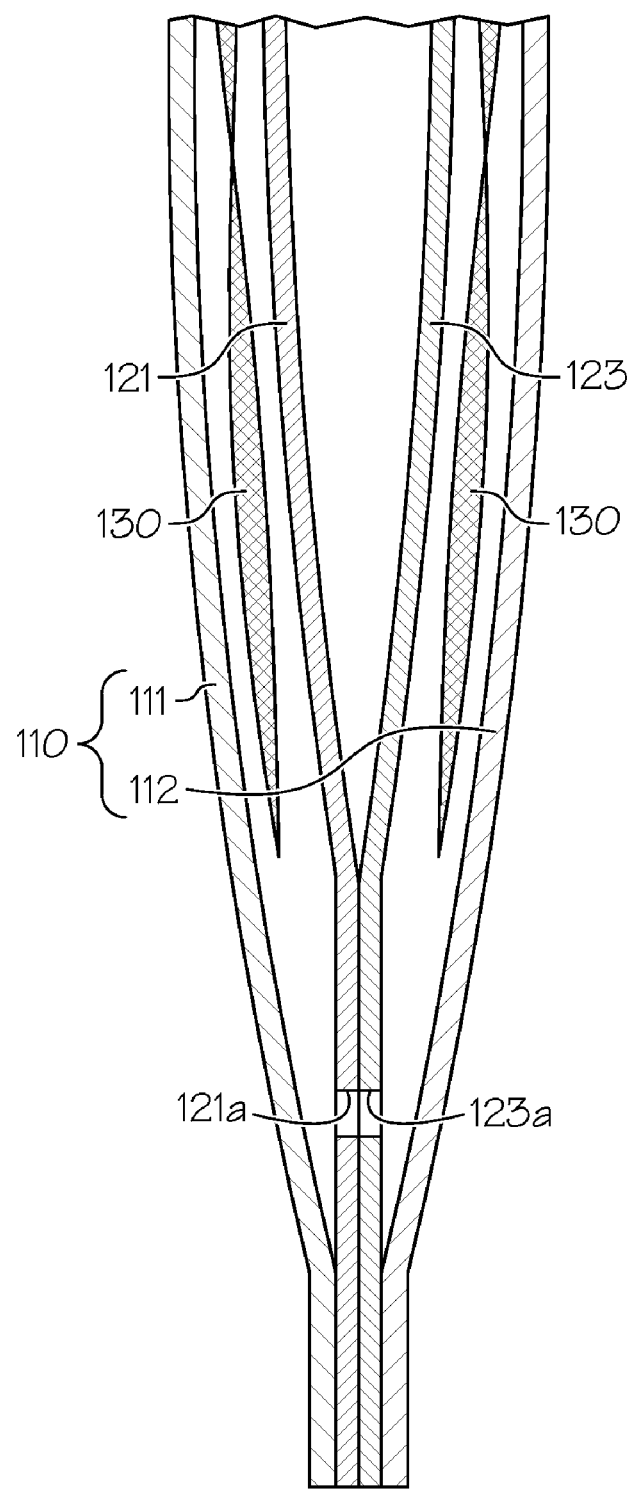
FIG. 5 shows a lower side cross-sectional view of the flameless, portable heating kit of claim of FIG. 1 according to an aspect of the present invention.

To retain the heat within kit 100, the bottom ends of kit 100 can be sealed to one another, thus trapping contents C and the heat within content chamber 115. This is shown in FIG. 5. As depicted, the bottom ends 121a and 123a of inner sides 121 and 123 are coupled (e.g., via snaps) to one another. This will form a closure at the bottom of kit 100.

Figure 6:
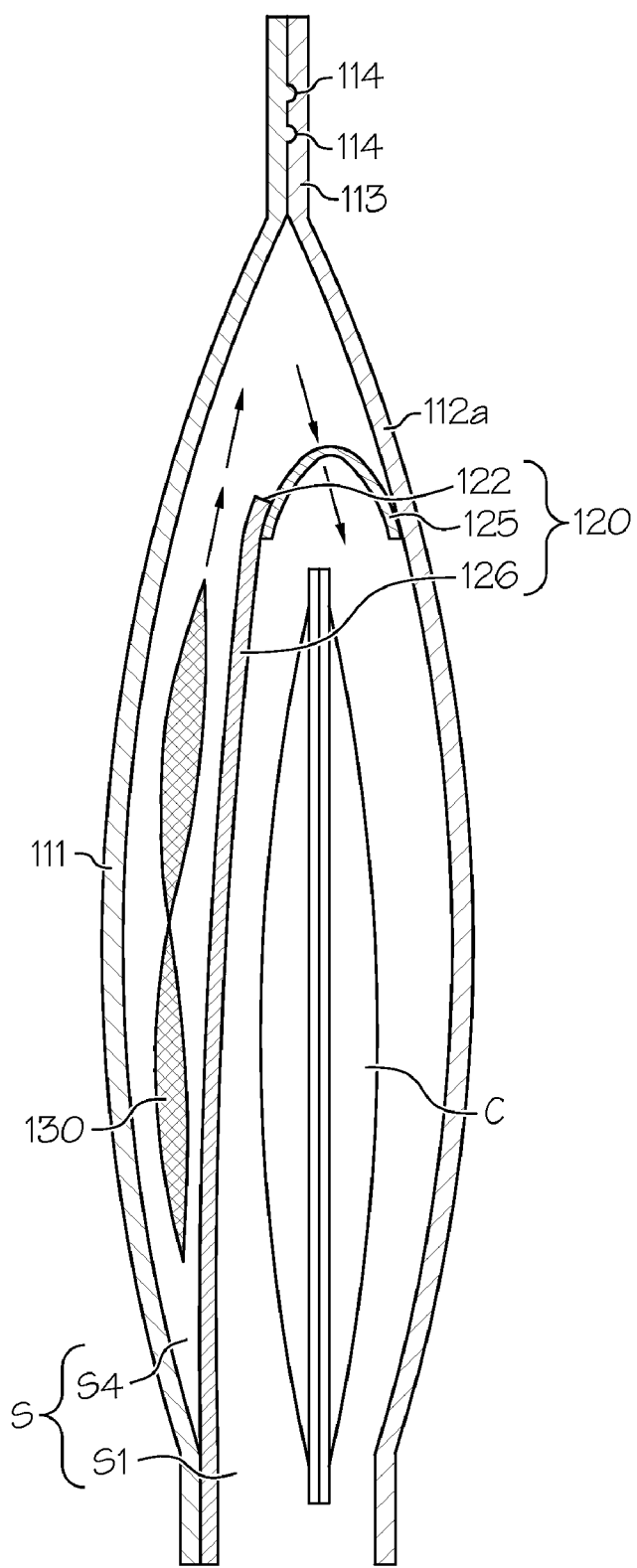
FIG. 6 shows a side cross-sectional view of the flameless, portable heating kit of claim of FIG. 1 according to another aspect of the present invention.

Referring now to FIG. 6, an alternative embodiment is shown. As shown, liquid activated heating material 130 is positioned only on one side of kit 100. Along these lines, kit 100 includes: one inner layer 126, first and second outer layers 111 and 112a, filter 125, and liquid activated heating material 130. As depicted, filter 125 couples inner layer 126 to second outer layer 112a. Liquid activated heating material 130 is placed between first outer layer 111 and inner layer 126. Other than these configuration changes, the functions of the device of FIG. 6 remain as described above with respect to FIGS. 1-5. For example, ends 114 of outer layers 111 and 112A seal to one another. In addition, the bottom end of inner layer 126 is coupled to the bottom end of first outer layer 111, thus creating a content chamber in heating space S1. Once liquid is poured through opening 113, the seal can be created at ends 114. The liquid will be directed around inner layer 126 to come in contact with and activate liquid activated heating material 130 to bring heat to heating spaces S1 and S4. This will heat contents C. Although not shown in FIG. 6, the bottom ends of inner layer 126 and second outer layer 112A can be coupled to one another (e.g., via snaps) to close off heating space S4.

Figure 7:
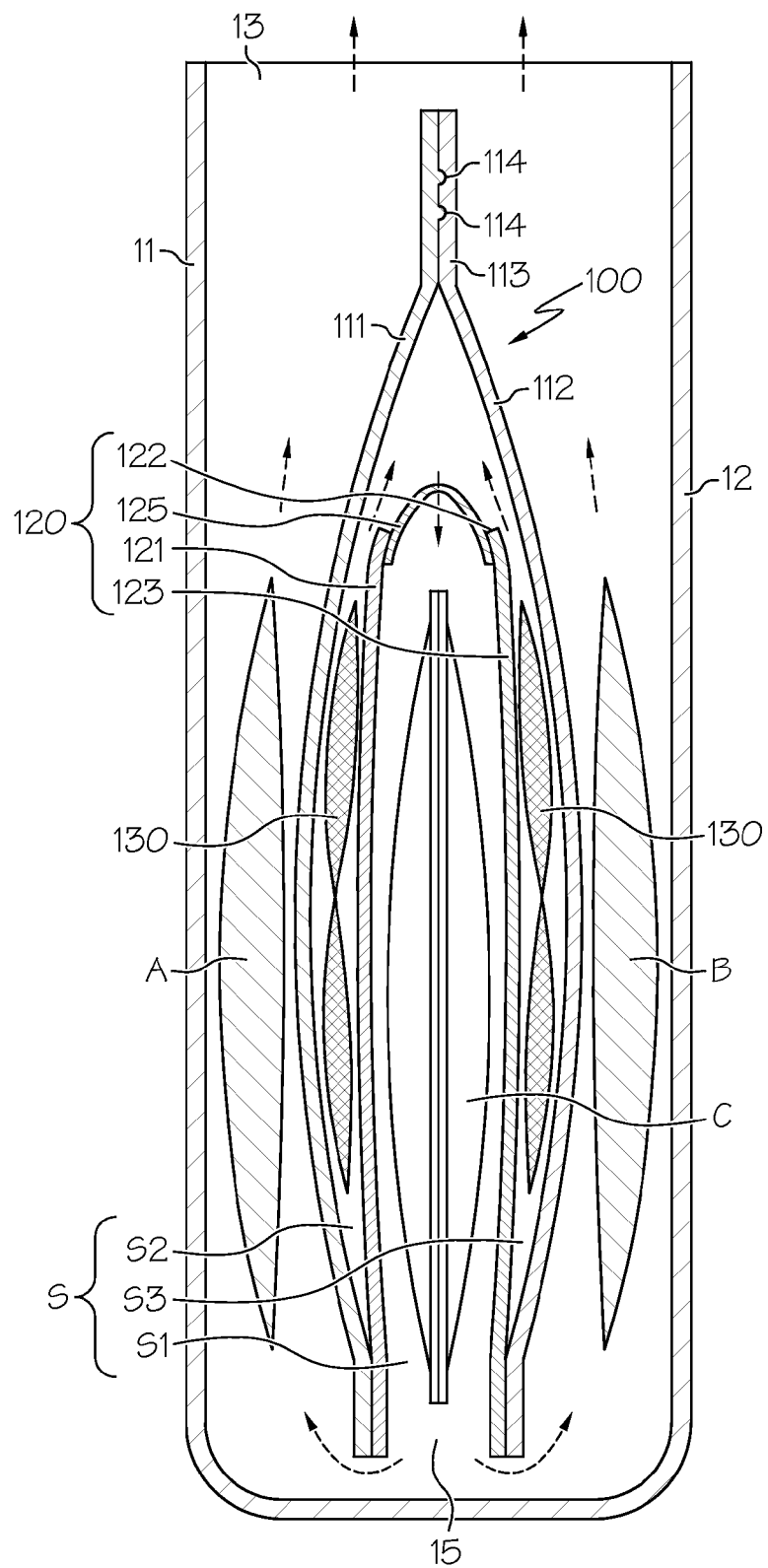
FIG. 7 shows

Referring to FIG. 7, a further example of how kit 100 may be used is shown. As depicted, kit 100 may be positioned within a container such as a pouch having sides 11 and 12, and skin 13. This allows additional content A and B to be heated using kit. As depicted, content A and B are positioned between outer surfaces of outer layers 111 and 113, and sides 11 and 12. The container can be sealed so that heat is trapped therein, and will circulate as shown by the arrows of FIG. 7.

Figure 8:
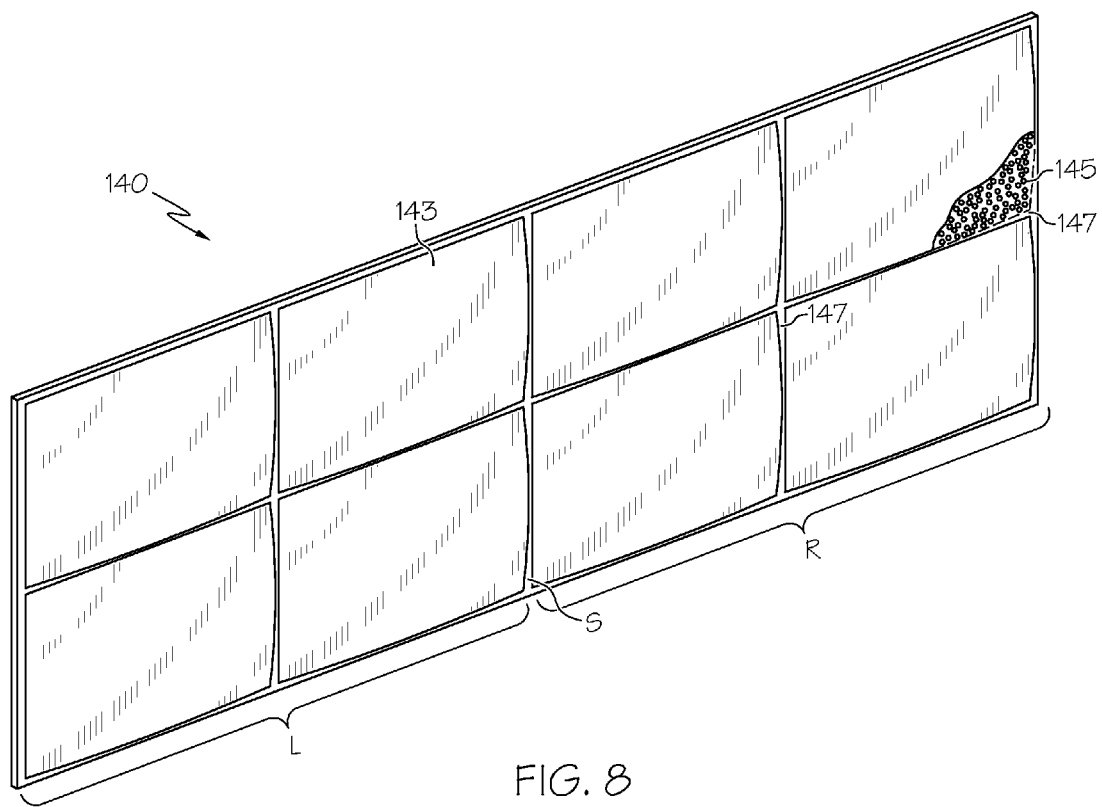
FIG. 8 shows a heat absorption pad according to an aspect of the present invention.

Referring now to FIG. 8 a heat absorption pad 140 is shown. In a typically embodiment, heat absorption pad 140 includes absorption bag 143, absorption material such as a molecular sieve, polyacrylate gel, or an upper absorbent polymer, and frame 147. As will be further described, absorption pad can be used in conjunction with kit 100 to further retain the heat generated by liquid activated heating material 130.

Figure 9:
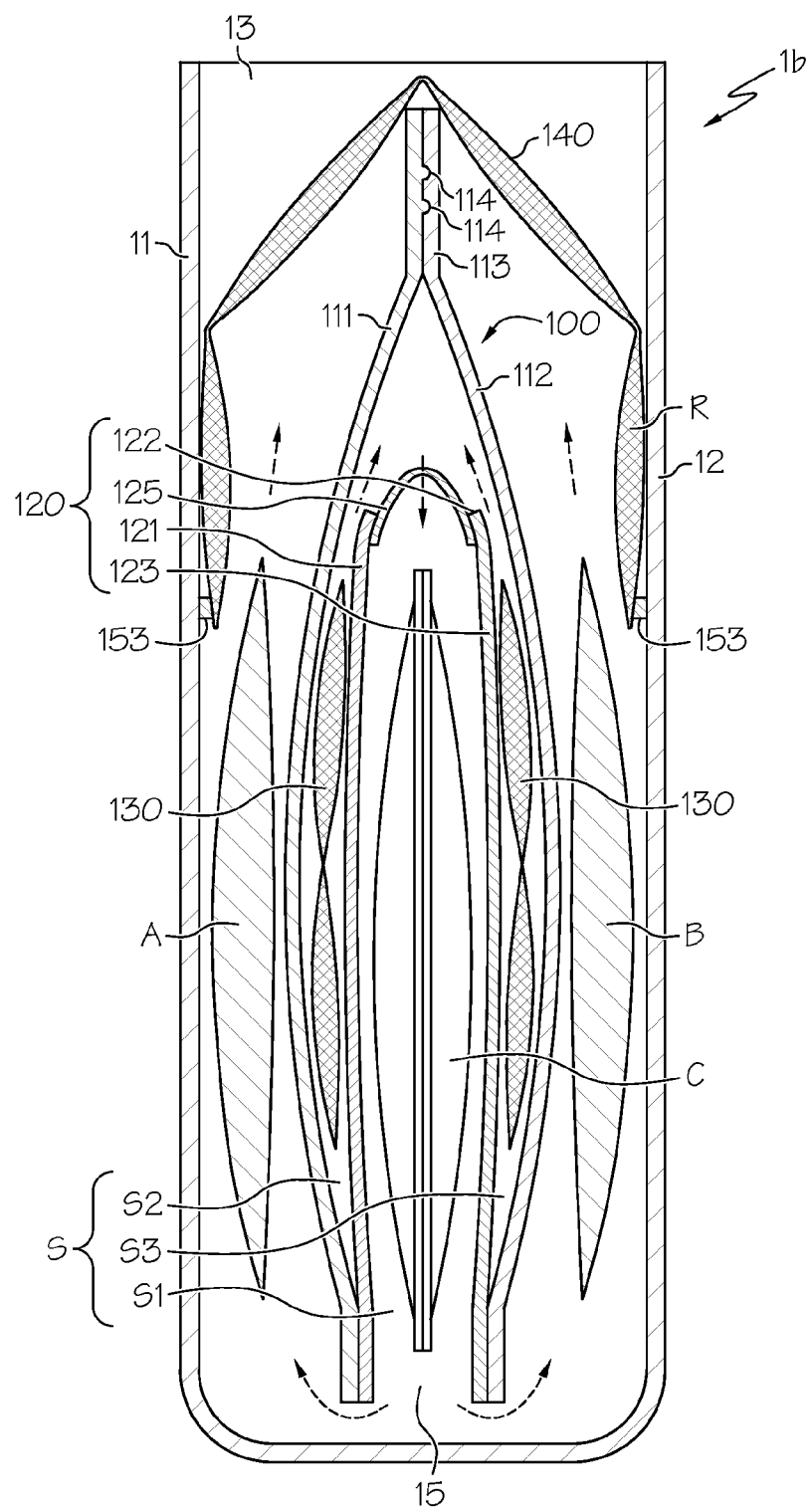
FIG. 9 shows the heat absorption pad of FIG. 8 as used in conjunction with the components of FIG. 7 according to an aspect of the present invention.

One example of this is shown in FIG. 9. As shown, heat absorption pad 140 is positioned along the top end 114 of kit 100 and within the container. This will prevent generate heat from escaping the container. To this end, heat absorption pad 140 can be used whether the container is open or closed.

Figure 10:
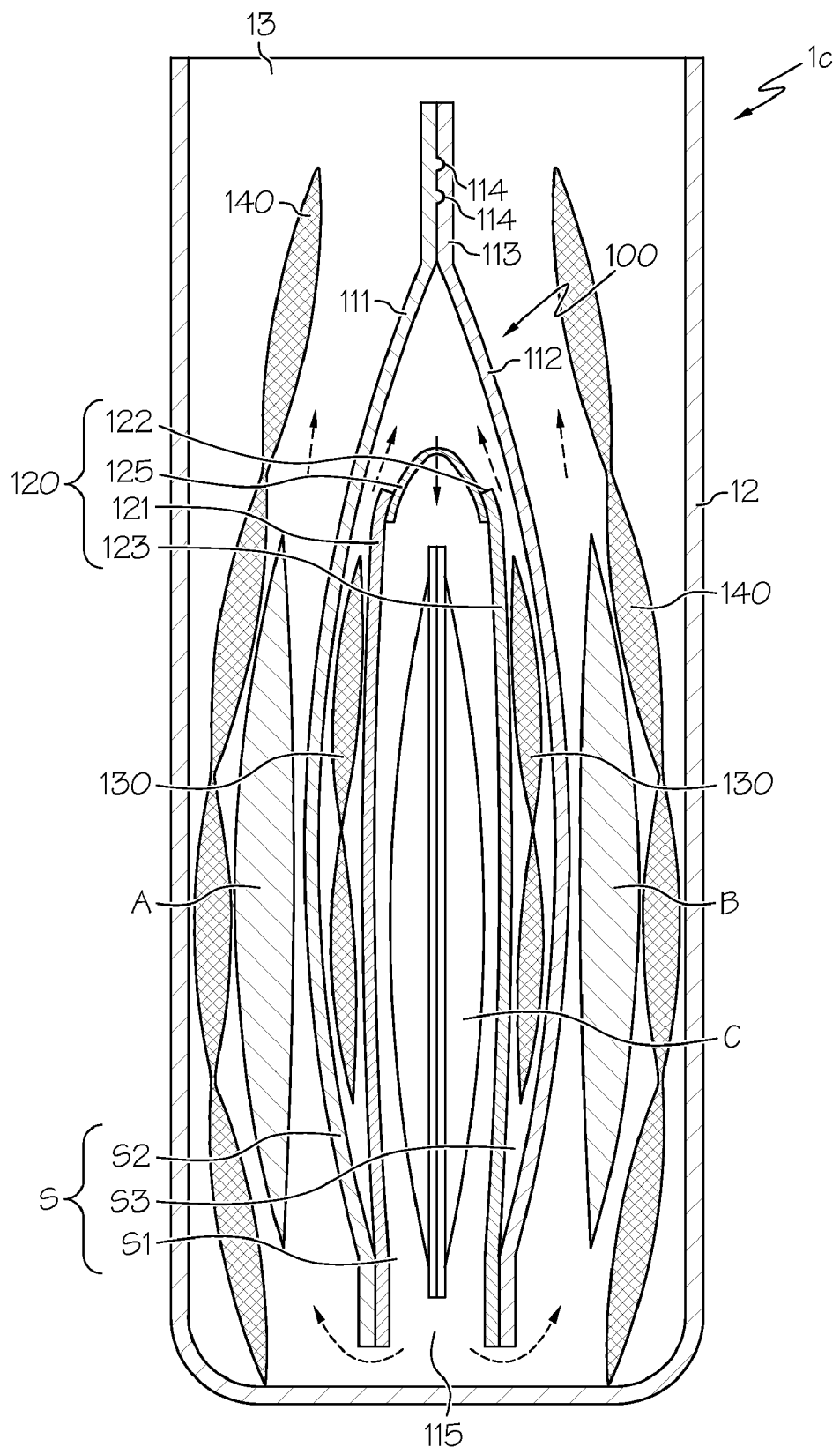
FIG. 10 shows the heat absorption pad of FIG. 8 as used in conjunction with the components of FIG. 7 according to another aspect of the present invention.
Figure 11:
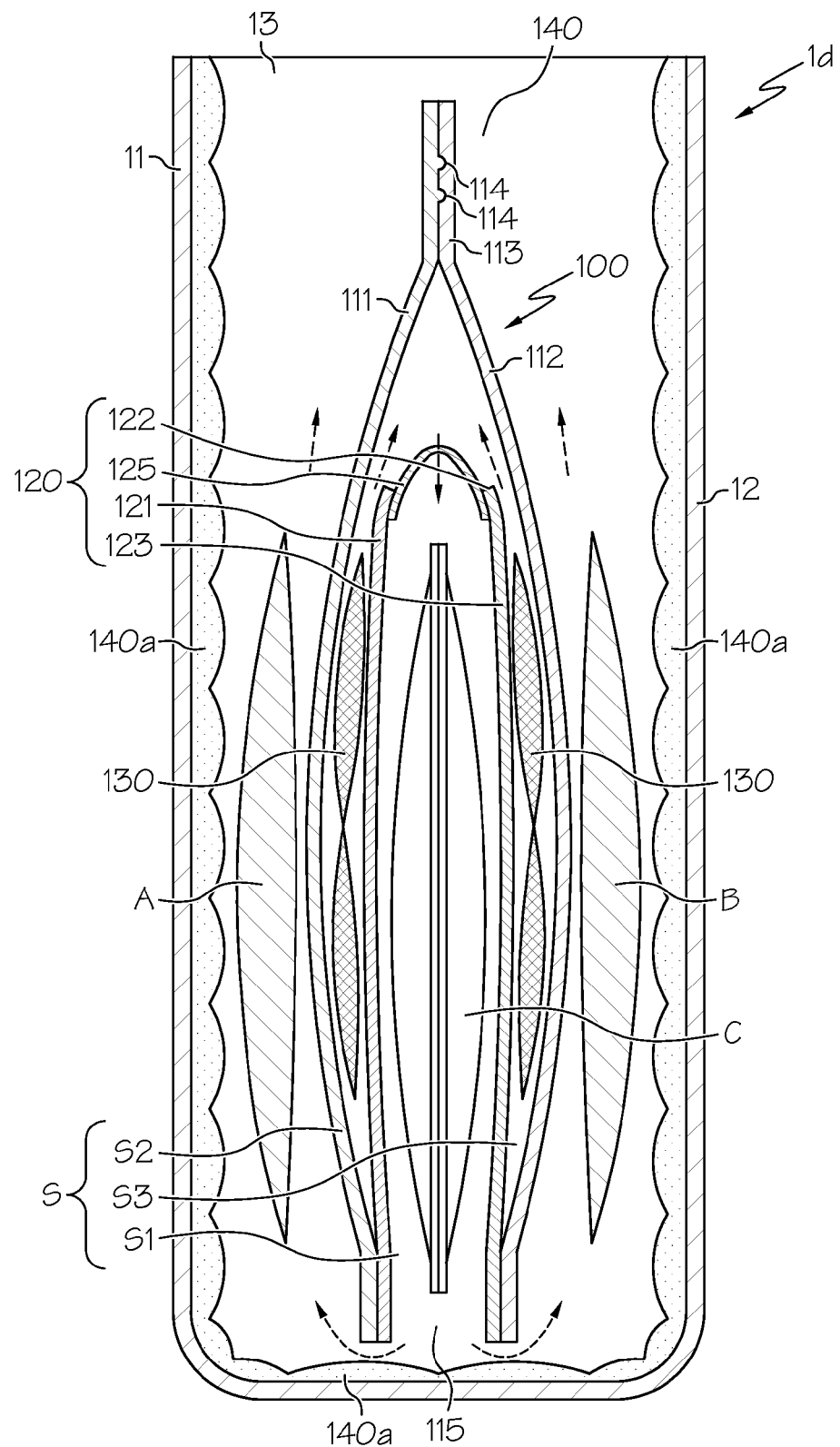
FIG. 11 shows the heat absorption pad of FIG. 8 as used in conjunction with the components of FIG. 7 according to another aspect of the present invention.

FIG. 10 shows another example of how heat absorption pad 140 can be used. As shown, multiple heat absorption pads can be used with the embodiment described above in conjunction with FIG. 7. That is heat absorption pads can be positioned within the container between outer layers 111 and 112, and sides 11 and 12. Although shown as being positioned between content A and B and sides 11 and 12, heat absorption pads 140 could be positioned between content A and B and outer layers 111 and 112. FIG. 11 shows yet another implementation. In this embodiment, a single heat absorption pad 140a can be provided as a liner of container to provide optimal heat retention.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A portable heating kit, comprising:
a first inner layer and a second inner layer;
a filter coupling the first inner layer to the second inner layer;
a first outer layer and a second outer layer surrounding the first inner layer, the second inner layer, and the filter; and
a liquid activated heating material disposed between at least one of the following: the first inner layer and the first outer layer, or the second inner layer and the second outer layer.

2. The portable heating kit of claim 1, the filter directing a flow of a liquid around outer surfaces of the first inner layer and the second inner layer.

3. The portable heating kit of claim 2, the filter coupling an inner surface of the first inner layer to an inner surface of the second inner layer.

4. The portable heating kit of claim 1, the first inner layer, the second inner layer, the first outer layer, the second outer layer each having a first end and a second end.

5. The portable heating kit of claim 4, the first end of the first outer layer and the first end of the second outer layer being configured to create a seal with one another.

6. The portable heating kit of claim 4, the second end of the first inner layer being coupled to the second end of the first outer layer, and the second end of the second inner layer being coupled to the second end of the second outer layer.

7. The portable heating kit of claim 1, further comprising a content chamber positioned between inner surfaces of the first inner layer and the second inner layer, the content chamber being configured to receive content to be heated.

8. The portable heating kit of claim 1, the liquid activated heating material comprising a set of liquid activated heating packs disposed between the first inner layer and the first outer layer, and between the second inner layer and the second outer layer.

9. The portable heating kit of claim 1, further comprising at least one portable heat absorption pad positioned between the portable heating kit and a container in which the portable heating kit is located.

10. A flameless, portable heating kit, comprising:
a first inner layer and a second inner layer;
a filter coupling the first inner layer to the second inner layer the filter directing a flow of a liquid around outer surfaces of the first inner layer and the second inner layer;
a first outer layer and a second outer layer surrounding the first inner layer, the second inner layer, and the filter;
a liquid activated heating material disposed between at least one of the following: the first inner layer and the first outer layer, or the second inner layer and the second outer layer; and
wherein the first inner layer, the second inner layer, the first outer layer, the second outer layer each have a first end and a second end, and wherein the first end of the first outer layer and the first end of the second outer layer are configured to create a seal with one another.

11. The flameless portable heating kit of claim 10, the second end of the first inner layer being coupled to the second end of the first outer layer, and the second end of the second inner layer being coupled to the second end of the second outer layer.

12. The flameless portable heating kit of claim 10, further comprising a content chamber positioned between inner surfaces of the first inner layer and the second inner layer, the content chamber being configured to receive content to be heated.

13. The flameless portable heating kit of claim 10, the liquid activated heating material comprising a set of liquid activated heating packs disposed between the first inner layer and the first outer layer, and between the second inner layer and the second outer layer.

14. The flameless portable heating kit of claim 10, further comprising at least one portable heat absorption pad positioned between the portable heating kit and a container in which the portable heating kit is located.

15. A method for flameless heating, comprising:
receiving a liquid into a flameless, portable heating kit;
directing the liquid around a filter that connects a first inner layer and a second inner layer of the flameless, portable heating kit; and
activating a liquid activated heating material with the liquid, the heating material being positioned between at least one of the following: the first inner layer and a first outer layer of the flameless, portable heating kit, or the second inner layer and a second outer layer of the flameless, portable heating kit.

16. The method of claim 15, further comprising heating using the heating material after the activating, the contents being positioned in a content chamber that is positioned between the first inner layer and the second inner layer.

17. The method of claim 16, further comprising sealing the first outer layer to the second outer layer.

18. The method of claim 15, the activating occurring upon contact of the liquid with the liquid activated heating material.

19. The method of claim 15, further comprising containing the heat in the flameless, portable heating kit using at least one heat absorption pad.

20. The method of claim 19, the heat absorption pad being positioned between the flameless, portable heating kit and a container in which the flameless, portable heating kit is located.

* * * * *